United States Patent
Choi

(10) Patent No.: US 12,087,316 B2
(45) Date of Patent: Sep. 10, 2024

(54) VEHICLE QUALITY PROBLEM MANAGEMENT SYSTEM AND METHOD FOR PROCESSING DATA THEREOF

(71) Applicants: HYUNDAI MOTOR COMPANY, Seoul (KR); KIA CORPORATION, Seoul (KR)

(72) Inventor: Byoung Il Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 373 days.

(21) Appl. No.: 17/579,899

(22) Filed: Jan. 20, 2022

(65) Prior Publication Data

US 2023/0005493 A1 Jan. 5, 2023

(30) Foreign Application Priority Data

Jul. 5, 2021 (KR) .................. 10-2021-0088007

(51) Int. Cl.
*G10L 21/0232* (2013.01)
*G06F 40/20* (2020.01)
*G10L 15/22* (2006.01)
*G10L 15/30* (2013.01)
*G10L 25/60* (2013.01)

(52) U.S. Cl.
CPC .......... *G10L 21/0232* (2013.01); *G06F 40/20* (2020.01); *G10L 15/22* (2013.01); *G10L 15/30* (2013.01); *G10L 25/60* (2013.01)

(58) Field of Classification Search
CPC ..... G10L 21/0232; G10L 15/22; G10L 15/30; G10L 25/60; G06F 40/20
See application file for complete search history.

(56) References Cited

U.S. PATENT DOCUMENTS

| | | | |
|---|---|---|---|
| 10,062,219 B2 * | 8/2018 | Richter | G07C 5/008 |
| 10,629,199 B1 * | 4/2020 | Parthasarathy | G10L 19/167 |
| 11,763,096 B2 * | 9/2023 | Tunstall-Pedoe | G06Q 10/1053 704/9 |
| 2010/0054118 A1 * | 3/2010 | Hughes | H04L 67/562 370/216 |
| 2019/0027137 A1 * | 1/2019 | Sohn | G10L 15/30 |
| 2019/0115017 A1 * | 4/2019 | Sim | G10L 25/51 |
| 2020/0020331 A1 * | 1/2020 | Kim | G10L 15/30 |

(Continued)

FOREIGN PATENT DOCUMENTS

| | | | | |
|---|---|---|---|---|
| AU | 2014214676 A1 * | 8/2015 | ........... | G03G 5/0596 |
| CA | 3163622 A1 * | 7/2021 | ....... | G06F 16/24578 |

(Continued)

*Primary Examiner* — Mohammad K Islam

(74) *Attorney, Agent, or Firm* — McDonnell Boehnen Hulbert & Berghoff LLP

(57) ABSTRACT

The present disclosure relates to a vehicle quality problem management system and a data processing method thereof. The system includes a management server including a server communication device that performs wireless communication with a mobile device, and a server processing device connected to the server communication device, and the server processing device receives a voice signal containing a current quality problem from the mobile device, converts the current quality problem in the voice signal to text using speech to text (STT), and registers the current quality problem converted into the text in a database (DB).

13 Claims, 5 Drawing Sheets

(56) References Cited

U.S. PATENT DOCUMENTS

| | | | |
|---|---|---|---|
| 2020/0027283 A1* | 1/2020 | Nishikawa | G07C 5/008 |
| 2022/0118926 A1* | 4/2022 | Park | G06F 3/167 |
| 2023/0083706 A1* | 3/2023 | Kakemura | G10L 15/22 |
| | | | 704/246 |
| 2024/0086645 A1* | 3/2024 | Tunstall-Pedoe | G06F 40/205 |

FOREIGN PATENT DOCUMENTS

| | | | | |
|---|---|---|---|---|
| CN | 109474671 A | * | 3/2019 | G01N 33/98 |
| CN | 112000791 B | * | 2/2024 | G06F 16/3329 |
| KR | 20170051591 A | * | 10/2015 | H04L 43/50 |

* cited by examiner

| STATE | REGISTRATION NUMBER | PART NUMBER | PROBLEM | COUNTERMEASURE | EVALUATION TEAM | EVALUATOR | ACTION TEAM | PERSON IN CHARGE OF ACTION | LABELING | IMPROVEMENT STATUS | |
|---|---|---|---|---|---|---|---|---|---|---|---|
| WRITING COMPLETED | H-DN8-PROTO-001 | 0400-0005 | (...) | (...) | QUALITY TEAM 1 | Asher | ELECTRONIC TEAM 1 | Harry | N/A | IMPROVEMENT COMPLETED | (...) |
| WRITING COMPLETED | H-DN8-PROTO-002 | 0000-0001 | (...) | | QUALITY TEAM 2 | Walter | TEST TEAM 1 | Mason | N/A | UNDER REVIEW | (...) |
| BEING WRITTEN | | 0060-8000 | (...) | | QUALITY TEAM 1 | Jayden | ELECTRONIC TEAM 1 | Danial | SIMILAR PROBLEM EXISTS | | (...) |

FIG.2

VEHICLE QUALITY PROBLEM MANAGEMENT SYSTEM AND METHOD FOR PROCESSING DATA THEREOF

CROSS REFERENCE TO RELATED APPLICATIONS

This application claims the benefit of priority to Korean Patent Application No. 10-2021-0088007, filed in the Korean Intellectual Property Office on Jul. 5, 2021, the entire contents of which are incorporated herein by reference.

TECHNICAL FIELD

The present disclosure relates to a vehicle quality problem management system and a method for processing data thereof.

BACKGROUND

As technologies such as autonomous driving, electrification, and/or connectivity are applied to a vehicle, numerous electric control units (ECUs) are being mounted. Such electric control units cooperate with each other using various communication schemes rather than operate individually (independently) for complex function implementation and stability. As complexity increases, errors and failures of the electric control units frequently occur in a field after a development step and mass production. To minimize field claims, many quality evaluators participate in extracting and resolving quality problems in the vehicle development step in advance. In addition, a system that may maximize a work efficiency to reduce a man hour (M/H) that is invested in extracting, resolving, and managing the quality problems in the development step is being continuously developed.

Numerous problems are extracted during a prototype and pilot vehicle development process. The extracted problems are registered and managed in a computerized system to prevent the same problem from occurring in a next vehicle model as well as to manage a problem improving history of a corresponding vehicle model. When the registration and the management off the problem are done by a single or a small number of people, it requires serious M/H consumption. When a problem is found in an evaluation target vehicle, the evaluator performs the problem registration in a following order:

① Find an issue in the vehicle from which the problem is found;
② Write down the problem on a notebook or a phone notepad;
③ After moving to an office, register a content written on the notepad in a 'quality problem history management computerized system'; and
④ Manage a history of the registered problem (perform update when an overall status, such as an improvement method, a schedule, and the like, changes).

When a simple evaluation is being conducted in a situation in which the vehicle is stopped, there is no problem in performing the processes from ① to ④. However, when a travel evaluation is conducted by the evaluator alone, because the evaluator is not able to remember all problems that occurred during a long travel time, there is a high probability of omission of the problem.

In addition, a time may also be delayed to write down the problem when two hands of the evaluator are not free because the evaluator is handling another evaluation equipment even when the evaluation is conducted in the situation in which the vehicle is stopped.

SUMMARY

The present disclosure has been made to solve the above-mentioned problems occurring in the prior art while advantages achieved by the prior art are maintained intact.

An aspect of the present disclosure provides a vehicle quality problem management system and a data processing method thereof that automatically register, in a management server, and label a quality problem uttered by an evaluator by utilizing STT (Speech to Text) and text similarity analysis technologies.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for managing a vehicle quality problem includes a management server including a server communication device that performs wireless communication with a mobile device, and a server processing device connected to the server communication device, and the server processing device receives a voice signal containing a current quality problem from the mobile device, converts the current quality problem in the voice signal into text using speech to text (STT), and registers the current quality problem converted into the text in a database (hereinafter, a DB).

In one implementation, the mobile device may include a microphone for receiving the voice signal.

In one implementation, the mobile device may perform noise filtering and the STT on the voice signal and transmit a result of the noise filtering and the STT to the management server.

In one implementation, the mobile device may set a DB category where the current quality problem is to be registered through voice recognition.

In one implementation, the server processing device may determine whether there is a further user who is performing quality problem registration in the same DB category as the set DB category, and transmit guide information indicating the existence of the further user to the mobile device when the further user exists.

In one implementation, the server processing device may determine a noise level of the voice signal and perform noise filtering when the noise level of the voice signal is equal to or higher than a preset reference level.

In one implementation, the server processing device may determine whether the current quality problem and a quality problem registered in advance in the DB are similar to each other through text similarity analysis, and pend DB registration completion of the current quality problem when the current quality problem and the quality problem registered in advance are similar to each other.

In one implementation, the server processing device may analyze the text similarity of the current quality problem and the quality problem registered in advance in the DB whose improvement has been completed, and register additional information of a quality problem with the highest similarity whose improvement has been completed as additional information of the current quality problem.

In one implementation, the additional information may include at least one of a part number, an action team, or a person in charge of an action.

According to another aspect of the present disclosure, a method for processing data of a system for managing a vehicle quality problem includes receiving a voice signal containing a current quality problem from a mobile device, converting the current quality problem in the voice signal into text using speech to text (STT), and registering the current quality problem converted into the text in a database (hereinafter, a DB).

In one implementation, the method may further include setting a DB category where the current quality problem is to be registered through voice recognition.

In one implementation, the method may further include determining whether there is a further user who is performing quality problem registration in the same DB category as the set DB category, transmitting guide information indicating the existence of the further user to the mobile device when the further user exists, and outputting, by the mobile device, the guide information in a form of at least one of visual information or auditory information.

In one implementation, the converting of the voice signal into the text may include determining a noise level of the voice signal and performing noise filtering when the noise level of the voice signal is equal to or higher than a preset reference level.

In one implementation, the registering of the current quality problem in the DB may include determining whether the current quality problem and a quality problem registered in advance in the DB are similar to each other through text similarity analysis, and pending DB registration completion of the current quality problem when the current quality problem and the quality problem registered in advance are similar to each other.

In one implementation, the registering of the current quality problem in the DB may further include analyzing the text similarity of the current quality problem and the quality problems registered in advance in the DB whose improvement has been completed, and registering additional information of a quality problem with the highest similarity whose improvement has been completed as additional information of the current quality problem.

BRIEF DESCRIPTION OF THE FIGURES

The above and other objects, features and advantages of the present disclosure will be more apparent from the following detailed description taken in conjunction with the accompanying drawings:

FIG. 2 is an exemplary diagram illustrating an example of a quality problem database according to embodiments of the present disclosure;

DETAILED DESCRIPTION

Figure 1:
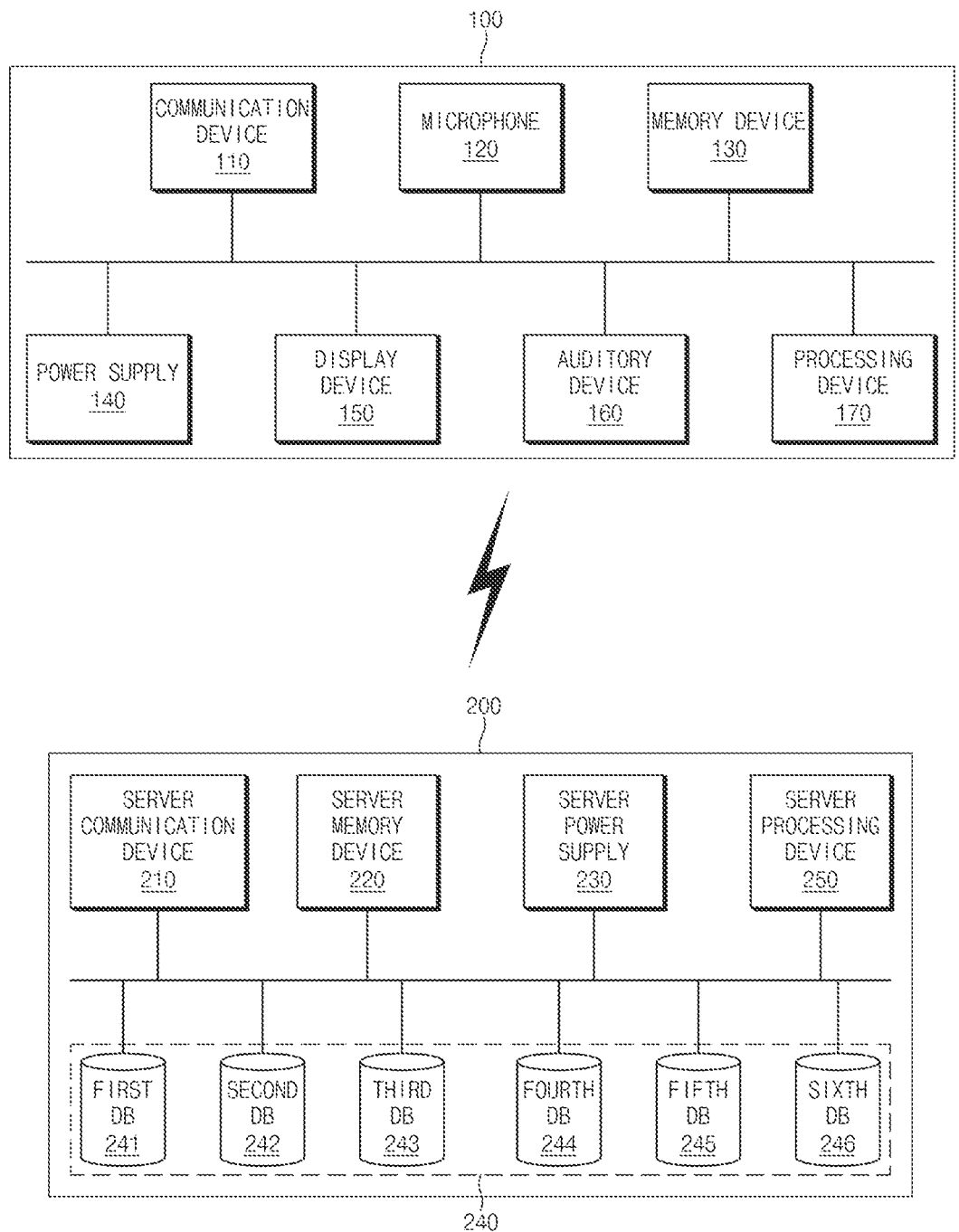
FIG. 1 is a block diagram illustrating a vehicle quality problem management system according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a vehicle quality problem management system according to embodiments of the present disclosure.

Referring to FIG. 1, a vehicle quality problem management system may include a mobile device 100 and a management server 200.

The mobile device 100, which is a device that a quality evaluator may carry, may include evaluation equipment, a smartphone, a tablet, and/or a wearable device. The mobile device 100 may include a communication device 110, a microphone 120, a memory device 130, a power supply 140, a display device 150, an auditory device 160, and/or a processing device 170.

The communication device 110 may support the mobile device 100 to perform wireless communication with the management server 200. The communication device 110 may be implemented with at least one of communication technologies such as wireless Internet, short-range communication, or mobile communication. As the wireless Internet technology, a wireless LAN (WLAN) (Wi-Fi), a wireless broadband (Wibro), and/or a world interoperability for microwave access (Wimax) may be used. As the short-range communication technology, a Bluetooth, a near field communication (NFC), a radio frequency identification (RFID), an infrared data association (IrDA), an ultra wideband (UWB), and/or a ZigBee may be used. As the mobile communication technology, a code division multiple access (CDMA), a global system for mobile communication (GSM), a long term evolution (LTE), an LTE-Advanced, and/or an international mobile telecommunication (IMT)-2020 may be used.

The microphone 120 may receive quality problem voice information uttered by a user. The microphone 120 may collect sound, convert the sound into an electrical signal, and output the electric signal. The microphone 120 may receive a voice signal (that is, an analog signal) uttered by the user (e.g., an evaluator) and convert the voice signal into digital voice data. Various noise removal algorithms for removing noise that is input together during the process of receiving the voice signal may be implemented in the microphone 120.

The memory device 130 may store information necessary for driving the mobile device 100, for example, setting information and the like. The memory device 130 may be a storage medium (a non-transitory storage medium) that stores instructions executed by the processing device 170. The memory device 130 may include a flash memory, a hard disk, a solid state disk (SSD), a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), an embedded multimedia card (eMMC), and/or universal flash storage (UFS).

The power supply 140 may supply power required to drive the mobile device 100. In other words, the power supply 140 may supply power required for an operation of each of the components 110 to 130 and 150 to 170 from an external power supply (e.g., a vehicle power supply) or an internal power supply (e.g., a battery) in response to control of the processing device 170.

The display device 150 may output various visual information to be guided to the user. The display device 150 may include at least one of a liquid crystal display (LCD), a thin film transistor-liquid crystal display (TFT-LCD), an organic light-emitting diode (OLED) display, a flexible display, a three-dimensional display (3D display), a transparent display, or a touch screen.

The auditory device 160 may output various auditory information to be guided to the user. The auditory device 160 may output audio data stored in the memory device 130. The auditory device 160 may include a receiver, a speaker, and/or a buzzer.

The processing device 170 may control overall operations of the mobile device 100. The processing device 170 may include at least one of an application specific integrated circuit (ASIC), a digital signal processor (DSP), a programmable logic device (PLD), a field programmable gate array (FPGA), a central processing unit (CPU), a microcontroller, or a microprocessor.

The processing device 170 may activate or deactivate the mobile device 100. When there is no input signal for a preset time, the processing device 170 switches an operation mode of the mobile device 100 from an active state to an inactive state (e.g., a sleep mode or a standby state) and maintains the inactive state, so that power consumption of the mobile device 100 may be minimized. The processing device 170 may switch the operation mode of the mobile device 100 from the inactive state to the active state when the input signal is received.

The processing device 170 may receive a call signal in the standby state. The processing device 170 may receive a call word uttered by the user through the microphone 120 as the call signal. The call word may be set in advance by the user. In addition, the processing device 170 may receive the call signal generated from a specific button to which a call function is assigned.

When the call signal is received, the processing device 170 may determine whether a database (hereinafter, a DB) category to which a quality problem is registered is preset. When the DB category is preset, the processing device 170 may first access the same DB category and determine whether there is at least one other user who is registering the quality problem. In one example, when the DB category is not preset, the processing device 170 may filter and set the DB category to which the quality problem is registered based on the voice signal of the user received by the microphone 120. The processing device 170 may filter the DB category based on at least one of filter conditions such as a vehicle model, a development step (e.g., a prototype), or a system (e.g., an electric device). The processing device 170 may filter and set the DB category, and then access the corresponding DB category first to determine whether there is at least one other user who is registering the quality problem.

When there is at least one other user who is registering the quality problem, the processing device 170 may inform that there is another user who is registering the quality problem in the same DB category. For example, the processing device 170 may output, on the display device 150, a guide message such as "N number of other users are already registering the quality problem in the same DB category". In this connection, the processing device 170 may convert the guide message into a voice signal and output the voice signal through the auditory device 160.

When the user utters a current quality problem (the quality problem), the processing device 170 may receive a voice signal including the quality problem through the microphone 120. The processing device 170 may transmit the voice signal input from the microphone 120 to the management server 200 using the communication device 110.

The processing device 170 may receive a quality problem registration performance result transmitted from the management server 200 using the communication device 110. The processing device 170 may output the received quality problem registration performance result on the display device 150 and the auditory device 160. The quality problem registration performance result may contain quality problem registration completion, quality problem registration pending, and/or pending reasons. For example, when the quality problem registration performance result contains the quality problem registration completion, the processing device 170 may output a guide message such as "quality problem registration has been completed" through the display device 150 and/or the auditory device 160.

When the voice signal is not received from the microphone 120 for the preset time, the processing device 170 may switch the operation mode of the mobile device 100 from the active state to the inactive state. The processing device 170 may wait until there is the voice signal input in the inactive state.

The management server 200 may manage the quality problem of the vehicle that occurs in a vehicle development process. The management server 200 may include a server communication device 210, a server memory device 220, a server power supply 230, a database (hereinafter, a DB) 240, and/or a server processing device 250.

The server communication device 210 may support the wireless communication between the mobile device 100 and the server 200. The server communication device 210 may be implemented with at least one of the communication technologies such as the wireless Internet, the short-range communication, and/or the mobile communication.

The server memory device 220 may include a noise filter, a speech to text (STT) engine, and/or a text similarity analysis engine. In addition, the server memory device 220 may store information necessary for driving the management server 200. The server memory device 220 may be a storage medium that stores instructions executed by the server processing device 250. The server memory device 220 may include the flash memory, the hard disk, the SSD, the RAM, the SRAM, the ROM, the PROM, the EEPROM, the EPROM, the eMMC, and/or the UFS.

The server power supply 230 may supply power (electric power) required for driving the management server 200. The server power supply 230 may supply power required for an operation of each of the components 210, 220, 240, and 250 from an external power supply (e.g., an alternating current (AC) power supply) in response to control of the server processing device 250.

The DB 240 may store and manage data (information) necessary for the quality problem management. The DB 240 may include a first DB 241, a second DB 242, a third DB 243, a fourth DB 244, a fifth DB 245, and a sixth DB 246. A DB access log may be stored (recorded) in the first DB 241. The DB access log includes identification information of the mobile device 100, a time at which the mobile device 100 accessed the DB 240, and/or identification information of the DB 241, 242, 243, 244, 245, or 246 accessed by the mobile device 100. A STT result may be temporarily stored in the second DB 242. The second DB 242 may serve as a buffer that temporarily stores the STT result before registering the STT result as the quality problem. The third DB 243 may store a frequency band of noise that occurs frequently in a vehicle evaluation space such as an evaluation site and/or a production plant. In other words, the third DB 243 may store information on various types of noise that occurs in the vehicle evaluation space. The fourth DB 244 may store the quality problem occurred in the vehicle development process. The fifth DB 245 may store part information such as a name of each part and/or a part number. The sixth DB 246 may store charge information such as a team in charge and/or a person in charge for each part.

The server processing device 250 may control overall operations of the management server 200. The server processing device 250 may include at least one of the ASIC, the DSP, the PLD, the FPGA, the CPU, the microcontroller, or the microprocessor.

The server processing device 250 may receive the voice signal transmitted from the mobile device 100 using the server communication device 210. The server processing device 250 may perform noise filtering on the received voice signal using a noise filter stored in the server memory device 220. The noise filter may remove the noise contained in the received voice signal using noise information stored in the third DB 243.

The server processing device 250 may convert the filtered voice signal into text using the STT engine. The server processing device 250 may convert the quality problem input with the voice signal into text. The server processing device 250 may determine a similarity between the converted text and text registered in advance in the fourth DB 244 using the text similarity analysis engine. A similarity determination result may be output as a probability value or a binary value. The server processing device 250 may determine a similarity between the quality problem contained in the voice signal, that is, the quality problem currently to be registered and a quality problem registered in advance in the fourth DB 244.

The server processing device 250 may determine whether the quality problem currently to be registered (hereinafter, the current quality problem) is similar to the quality problem registered in advance based on the similarity determination result. The server processing device 250 may determine that the two quality problems are similar to each other when the similarity between the two quality problems is equal to or greater than a preset reference similarity. The server processing device 250 may determine that the two quality problems are not similar to each other (different from each other) when the similarity between the two quality problems is smaller than the preset reference similarity. For example, when the reference similarity is 90%, the server processing device 250 may determine that the two quality problems are similar to each other when a similarity probability between the current quality problem and the quality problem registered in advance is 95%, and may determine that the two quality problems are different from each other when the similarity probability between the current quality problem and the quality problem registered in advance is 60%. As another example, when the similarity determination result is output as the binary value, the server processing device 250 may determine that the two quality problems are similar to each other when the similarity between the current quality problem and the quality problem registered in advance is '1', and may determine that the two quality problems are not similar to each other when the similarity between the current quality problem and the quality problem registered in advance is '0'.

When the current quality problem and the quality problem registered in advance are similar to each other, the server processing device 250 may register the current quality problem in the fourth DB 244. In other words, the server processing device 250 may register the current quality problem as a registration completion state (e.g., a 'writing completed' state) in the fourth DB 244. The server processing device 250 may select the most similar quality problem by performing text similarity analysis on the registered current quality problem and the quality problems registered in advance whose improvement has been completed. In this connection, the server processing device 250 may perform the text similarity analysis on all data of the fourth DB 244. The server processing device 250 may register (insert) a part number of the selected quality problem as a part number corresponding to the registered current quality problem. In addition, the server processing device 250 may identify a team in charge and/or a person in charge for the registered part number in the sixth DB 246 and register the team in charge and/or the person in charge as a team and/or a person in charge of an action of the corresponding quality problem. When registration of additional information (e.g., the part number and/or the team and/or the person in charge of the action) related to the quality problem is completed, the server processing device 250 may determine the quality problem registration completion.

When the current quality problem and the quality problem registered in advance are not similar to each other, the server processing device 250 may transmit guide information indicating the quality problem registration pending to the mobile device 100. The guide information may contain the quality problem registration pending, the pending reasons, and the like. The server processing device 250 may add a separate labeling in response to the current quality problem.

After transmitting the guide information indicating the current quality problem registration pending to the mobile device 100, the server processing device 250 may register the current quality problem in the fourth DB 244 as a pending state (e.g., a 'being written' state).

The server processing device 250 may transmit guide information indicating that the current quality problem is registered in the fourth DB 244 to the mobile device 100. The guide information may be transmitted to the mobile device 100 in a form of visual information and/or auditory information.

FIG. 2 is an exemplary diagram illustrating an example of a quality problem database according to embodiments of the present disclosure.

Referring to FIG. 2, a quality problem DB managed in the fourth DB 244 may be composed of a state field, a registration number field, a part number field, a problem field, a countermeasure field, an evaluation team field, an evaluator field, an action team field, a person in charge of action field, a labeling field, an improvement status field, and the like. Whether the quality problem has been completely written may be input (inserted) into the state field. Whether a similar quality problem is registered in advance in the fourth DB 244 may be input in the labeling field. When the labeling such as "similar problem exists" is input in the labeling field, 'being written' may be input in the state field until final identification of the user (e.g., the evaluator). A unique number that is not duplicated for the quality problems, that is, the identification information may be input in the registration number field. Identification information (e.g., a name, a mobile device unique number, an ID, and the like) of the evaluator and the person in charge of the action may be input in the evaluator field and the person in charge of the action field, respectively.

Figure 3:
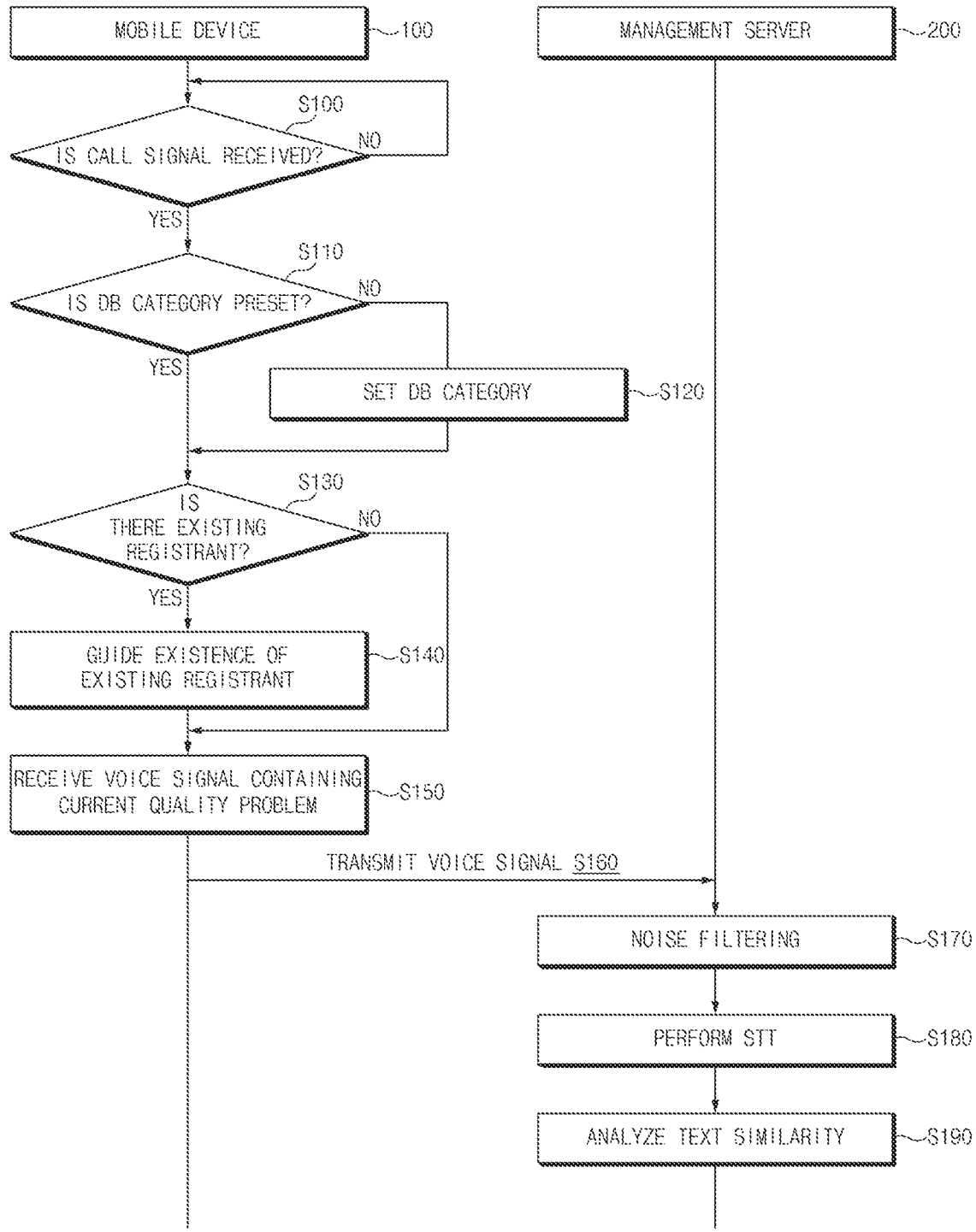
FIGS. 3 and 4 are flowcharts illustrating a data processing method of a vehicle quality problem management system according to embodiments of the present disclosure.
Figure 4:
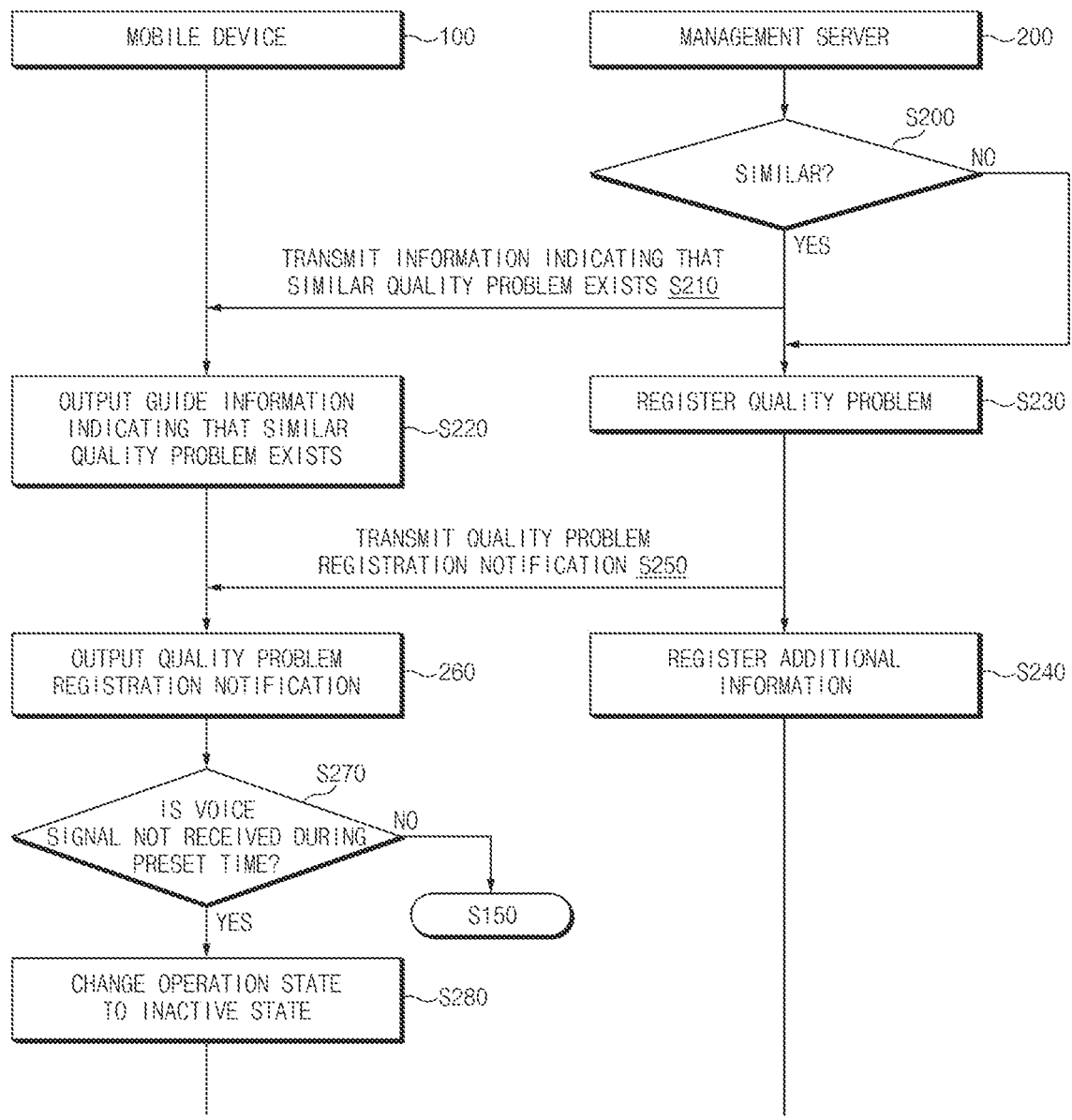

FIGS. 3 and 4 are flowcharts illustrating a data processing method of a vehicle quality problem management system according to embodiments of the present disclosure.

The mobile device 100 may determine whether the call signal is received at S100. When the user (e.g., the evaluator) utters the call word in the state in which the mobile device 100 is inactive (e.g., the sleep state), the microphone 120 may receive the uttered call word and generate a call signal corresponding to the corresponding call word. The processing device 170 of the mobile device 100 may receive the call signal generated from the microphone 120. As another example, the microphone 120 may directly transmit the input call word, that is, the voice signal to the processing device 170. The processing device 170 may recognize the call word contained in the voice signal received from the microphone 120 as the call signal. As another example, when the user manipulates the physical button to which the call function is assigned, the corresponding button may generate the call signal, and the processing device 170 may receive the call signal generated from the button. The processing device 170 may switch the operation mode of the mobile device 100 from the inactive state to the active state when the call signal is received.

The mobile device 100 may determine whether the DB category is preset at S110. The mobile device 100 may determine whether the DB category to which the quality problem is to be registered is presets by the user.

The mobile device 100 may set the DB category when the DB category is not preset at S120. The mobile device 100 may receive the filter conditions from the user through voice recognition. The filter conditions may include the vehicle model, the development step, and/or the system. The mobile device 100 may set the DB category to which the quality problem is to be registered based on the received filter conditions.

The mobile device 100 may determine whether there is at least one other user who is registering the quality problem that is, an existing registrant, in the DB category set after S110 or S120 at S130. Although not shown in FIG. 3, the mobile device 100 may transmit information on the set DB category to the management server 200, and the management server 200 may determine whether there is another user who is registering the quality problem in the same DB category as the set DB category, and transmit a determination result to the mobile device 100. The management server 200 may identify access times of the users based on the access log stored in the first DB 241, and may determine whether there is the existing registrant who is registering the quality problem in the same DB category based on the access times of the users.

When the existing registrant exists, the mobile device 100 may output guide information indicating that the existing registrant exists at S140. The mobile device 100 may output the guide information indicating whether there is the existing registrant identified through the communication with the management server 200 in a form of visual information and/or auditory information. The mobile device 100 may output text and/or an emoticon indicating that another user who is registering the quality problem in the same DB category exists on the display device 150. In addition, the mobile device 100 may output, on the auditory device 160, a voice message indicating that another user who is registering the quality problem exists in the same DB category.

Thereafter, the mobile device 100 may receive the voice signal containing the current quality problem from the microphone 120 at S150. The mobile device 100 may receive the voice signal uttered by the user through the microphone 120 when the user utters the current quality problem.

The mobile device 100 may transmit the received voice signal to the management server 200 at S160. The mobile device 100 may transmit the voice signal containing the current quality problem using the communication device 110. The management server 200 may receive the voice signal transmitted from the mobile device 100 using the server communication device 210.

The management server 200 may receive the voice signal transmitted from the mobile device 100 and perform the noise filtering at S170. The management server 200 may perform the noise filtering when a noise level of the received voice signal is equal to or higher than a preset reference level. The management server 200 may reduce the noise contained in the voice signal by utilizing the noise information stored in the third DB 243. In the third DB 243, the frequency band of the noise that routinely occurs in the vehicle evaluation site and/or the production plant is databased. The management server 200 may reduce the noise of the voice signal by filtering the frequency band of the noise in the received voice signal.

The management server 200 may convert the noise-filtered voice signal to the text by performing the STT at S180. The management server 200 may temporarily store the converted text, that is, the STT result in the second DB 242.

The management server 200 may analyze the similarity between the converted text and the text registered in the DB 240 at S190. The management server 200 may compare the current quality problem converted into the text and text registered in the problem field of the fourth DB 244, that is, the quality problem registered in advance to determine whether a quality problem similar to or identical to the current quality problem is registered in advance in the fourth DB 244. In other words, the management server 200 may determine whether the quality problem identical to or similar to the quality problem that the user is currently trying to register (the current quality problem) is registered in the same DB category by utilizing a text similarity analysis technology.

The management server 200 may determine whether the current quality problem and the quality problem registered in advance are similar (same) based on the text similarity analysis result at S200. The management server 200 may determine whether the similarity between the current quality problem and the quality problem registered in advance is equal to or greater than a threshold preset by the user. When the similarity between the two quality problems based on the text similarity analysis is equal to or greater than the threshold, the management server 200 may determine that the quality problem similar to or identical to the current quality problem is registered in advance in the same DB category. In one example, when the similarity between the two quality problems is smaller than the threshold, the management server 200 may determine that the quality problem similar to or identical to the current quality problem is not registered in advance in the same DB category. The text similarity analysis result may be output as the binary value 0 or 1. When the text similarity analysis result is 0, it may be determined that the two quality problems are different from each other. In addition, when the text similarity analysis result is 1, it may be determined that the two quality problems are similar to or identical to each other.

When the current quality problem and the quality problem registered in advance are similar to each other, the management server 200 may transmit information indicating that the similar quality problem exists to the mobile device 100 at S210. When the current quality problem and the quality problem registered in advance are similar to each other, the management server 200 may determine that the quality problem similar to or identical to the current quality problem is registered in advance in the fourth DB 244. The management server 200 may transmit guide information indicating that the quality problem similar to or identical to the current quality problem has been found in the fourth DB 244 to the mobile device 100. In addition, the management server 200 may perform the labeling process of "similar problem exists" for the current quality problem. That is, the management server 200 may insert a label into a labeling field (an attribute or a column) of a record in which the current quality problem is registered.

The mobile device 100 may output guide information indicating that the similar quality problem exists on the display device 150 and/or the auditory device 160 at S220. The mobile device 100 may output the guide information in a form of visual information and/or auditory information so as to be recognized by the user.

When the current quality problem and the quality problem registered in advance are not similar to each other, the management server 200 may register the current quality problem as a new quality problem in the fourth DB 244 at S230. When the current quality problem is not registered in advance in the fourth DB 244, the management server 200 may insert the current quality problem, that is, the STT result into the problem field of the fourth DB 244.

The management server 200 may additionally register the additional information related to the current quality problem registered in the fourth DB 244 after S230 at S240. The management server 200 may perform the text similarity analysis with past quality problems stored in the fourth DB 244 to determine in which part the registered current quality problem has occurred. The past quality problems may be defined as quality problems stored as "improvement completed" in the improvement status field. In this connection, the improvement completion means that, after a cause (that is, the part) of the quality problem is identified, a countermeasure is established and validation thereof is completed in the vehicle. Ostensibly, the part described in the problem may be the causative part, but the part at which the problem has occurred and the causative part may be different, so that cross-check may be done through the text similarity analysis with the past quality problems. In this connection, the similarity analysis result may be a probability value or a binary value. For example, when outputting the probability value as the similarity analysis result, the management server 200 may determine that the current quality problem is in the same problem type as the past quality problem when the output probability value is equal to or greater than a threshold set by the user in advance. The management server 200 may insert a part number of the causative part determined to be in the same problem type into the part number field as a causative part number of the current quality problem. In addition, the management server 200 may identify a team in charge and/or a person in charge matching the part number registered in the part number field in the sixth DB 246, and insert the team in charge and/or the person in charge matching the part number into the action team and/or the person in charge of the action field of the quality problem DB.

The management server 200 may register the current quality problem in the fourth DB 244, and then, transmit a notification notifying that the current quality problem is registered in the fourth DB 244 to the mobile device 100 at S250. The mobile device 100 may output visual information and/or auditory information indicating that the quality problem registration has been completed.

The mobile device 100 may output the notification (e.g., the guide message) indicating that the current quality problem is registered in the fourth DB 244 on the display device 150 and/or the auditory device 160 at S260.

Thereafter, the mobile device 100 may determine whether a voice signal non-received state is maintained during a preset time at S270. When the voice signal is not received during the preset time, the mobile device 100 may change the operation state to the inactive state (the standby state) at S280.

The mobile device 100 may perform S150 when the voice signal non-received state is not maintained during the preset time.

In the above embodiments, it has been described that whether there is another user registering the quality problem by accessing the same DB category before the current user is determined, and the existence of another user is simply guided to the current user, but the present disclosure is not limited thereto. The present disclosure may be implemented such that the management server 200 prohibits the system access and waits when users of a number equal to or greater than a preset number are performing voice recognition-based quality problem registration.

In addition, in the above embodiments, it has been described that the mobile device 100 directly transmits the voice signal input through the microphone 120 to the management server 200, and the management server 200 performs the noise filtering and the STT, but the present disclosure may be implemented such that the mobile device 100 performs the noise filtering and the STT on the voice signal received through the microphone 120, and then, transmits a result of the noise filtering and the STT to the management server 200.

Figure 5:
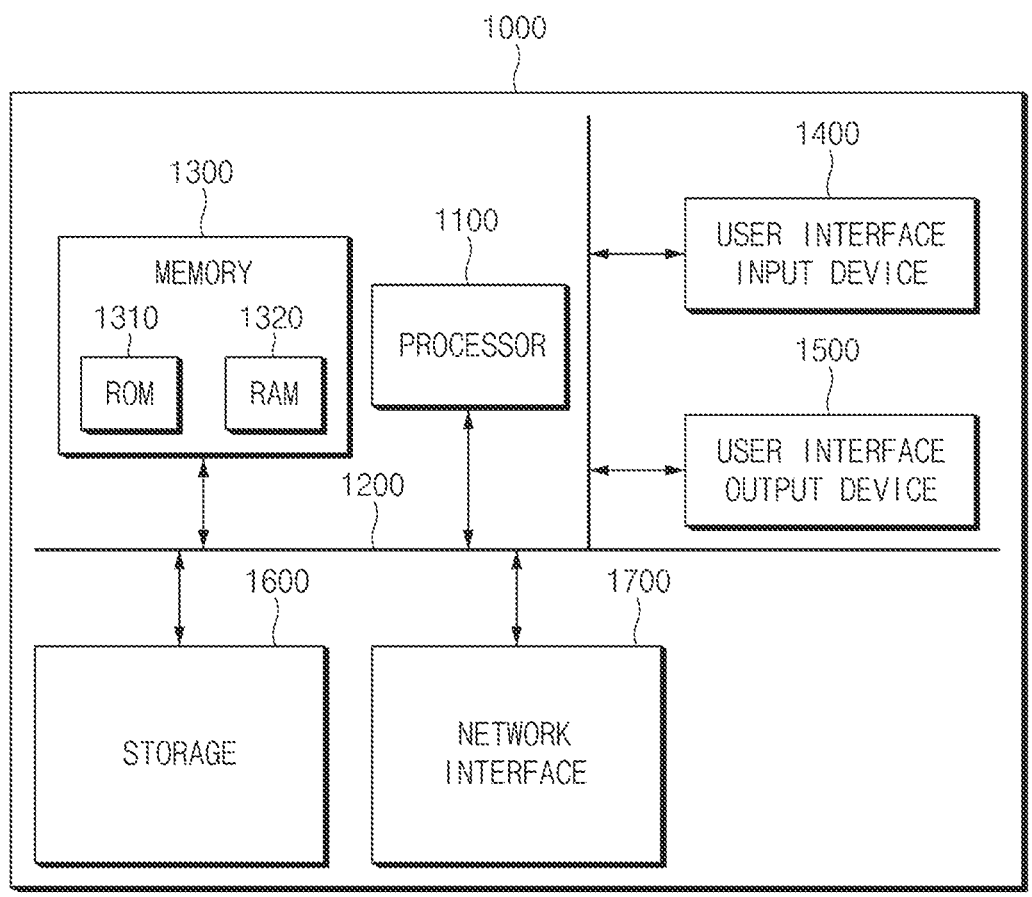
FIG. 5 is a block diagram illustrating a computing system executing a data processing method according to embodiments of the present disclosure.

FIG. 5 is a block diagram illustrating a computing system executing a data processing method according to embodiments of the present disclosure.

With reference to FIG. 5, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, when performing the travel evaluation alone for the vehicle or discovering the quality problem (a quality issue) while using the evaluation equipment, the vehicle quality problem may be automatically registered in the management server using the speech to text (STT).

In addition, according to the present disclosure, the man hour (M/H) of a worker may be reduced by automatically inserting the information that must be additionally input, such as the action team, the person in charge of the action, and/or the part number using the text similarity analysis technology.

In addition, according to the present disclosure, duplicate registration of the same or similar quality problem may be prevented through the text similarity analysis.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A system for managing a vehicle quality problem, the system comprising:
    a management server including:
        a server communication device configured to perform wireless communication with a mobile device; and
        a server processing device connected to the server communication device, wherein the server processing device is configured to:
        receive a voice signal containing a current quality problem from the mobile device;
        convert the current quality problem in the voice signal into text using speech to text (STT); and
        register the current quality problem converted into the text in a database (DB);
        wherein the server processing device is configured to:
            determine whether the current quality problem and a quality problem registered in advance in the DB are similar to each other through text similarity analysis; and
            pend DB registration completion of the current quality problem when the current quality problem and the quality problem registered in advance are similar to each other.

2. The system of claim 1, wherein the mobile device includes a microphone for receiving the voice signal.

3. The system of claim 2, wherein the mobile device performs noise filtering and the STT on the voice signal, and transmits a result of the noise filtering and the STT to the management server.

4. The system of claim 1, wherein the mobile device sets a DB category where the current quality problem is to be registered through voice recognition.

5. The system of claim 4, wherein the server processing device is configured to:
    determine whether there is a further user who is performing quality problem registration in the same DB category as the set DB category; and
    transmit guide information indicating the existence of the further user to the mobile device when the further user exists.

6. The system of claim 1, wherein the server processing device is configured to determine a noise level of the voice signal and perform noise filtering when the noise level of the voice signal is equal to or higher than a preset reference level.

7. The system of claim 1, wherein the server processing device is configured to analyze the text similarity of the current quality problem and the quality problem registered in advance in the DB whose improvement has been completed, and register additional information of a quality problem with the highest similarity whose improvement has been completed as additional information of the current quality problem.

8. The system of claim 7, wherein the additional information includes at least one of a part number, an action team, or a person in charge of an action.

9. A method for processing data of a system for managing a vehicle quality problem, the method comprising:
    receiving, by a server processing device, a voice signal containing a current quality problem from a mobile device using a server communication device performing wireless communication with the mobile device;
    converting, by the server processing device, the current quality problem in the voice signal into text using speech to text (STT); and
    registering, by the server processing device, the current quality problem converted into the text in a database (DB);
    wherein registering the current quality problem in the DB includes:
        determining, by the server processing device, whether the current quality problem and a quality problem registered in advance in the DB are similar to each other through text similarity analysis; and
        pending, by the server processing device, DB registration completion of the current quality problem when the current quality problem and the quality problem registered in advance are similar to each other.

10. The method of claim 9, further comprising:
setting, by the server processing device, a DB category where the current quality problem is to be registered through voice recognition.

11. The method of claim 10, further comprising:
determining, by the server processing device, whether there is a further user who is performing quality problem registration in the same DB category as the set DB category;
transmitting, by the server processing device, guide information indicating the existence of the further user to the mobile device when the further user exists; and
outputting, by the mobile device, the guide information in a form of at least one of visual information or auditory information.

12. The method of claim 9, wherein converting the voice signal into the text includes:
determining, by the server processing device, a noise level of the voice signal and performing noise filtering when the noise level of the voice signal is equal to or higher than a preset reference level.

13. The method of claim 9, wherein registering the current quality problem in the DB further includes:
analyzing, by the server processing device, the text similarity of the current quality problem and the quality problem registered in advance in the DB whose improvement has been completed; and
registering, by the server processing device, additional information of a quality problem with the highest similarity whose improvement has been completed as additional information of the current quality problem.

* * * * *